E. A. LA DOW.
ATTACHMENT FOR SCALES.
APPLICATION FILED JULY 18, 1919.

1,402,774.

Patented Jan. 10, 1922.

INVENTOR
Everett A. La Dow
By Day, Oberlin & Day
ATTORNEYS.

UNITED STATES PATENT OFFICE.

EVERETT A. LA DOW, OF CLEVELAND, OHIO.

ATTACHMENT FOR SCALES.

1,402,774. Specification of Letters Patent. Patented Jan. 10, 1922.

Application filed July 18, 1919. Serial No. 311,821.

*To all whom it may concern:*

Be it known that I, EVERETT A. LA DOW, a citizen of the United States, and a resident of Cleveland, county of Cuyahoga, and State of Ohio, have invented a new and useful Improvement in Attachments for Scales, of which the following is a specification, the principle of the invention being herein explained and the best mode in which I have contemplated applying that principle so as to distinguish it from other inventions.

The present invention, relating as indicated, to attachment for scales is directed to a simple device adapted for convenient attachment to a steel scale or the like for rendering the same useful as a drill gauge, as well as providing convenient means for attaching the scale to the edge of the pocket of the user to prevent its loss. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
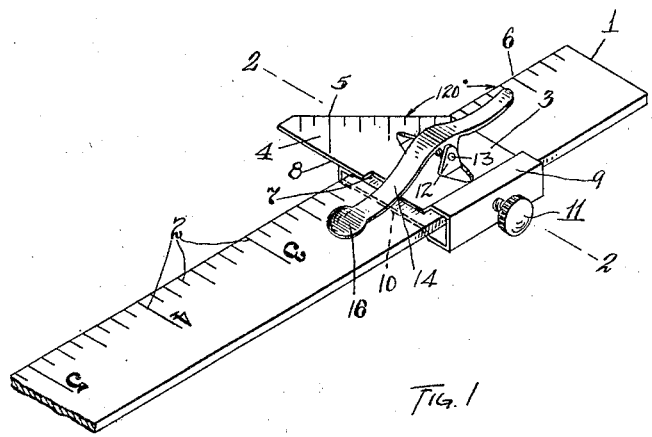
Figure 2:
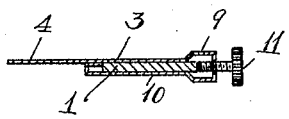
Figure 3:
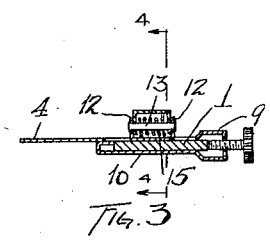
Figure 4:
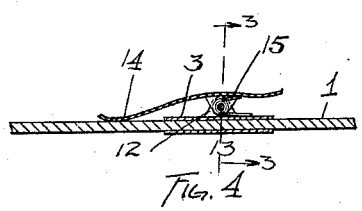

Fig. 1 is a perspective view of a scale with my device attached thereto; Fig. 2 is a transverse section on the line 2—2 in Fig. 1; Fig. 3 is a transverse section on the line 3—3 in Fig. 4; and Fig. 4 is a section on the line 4—4 in Fig. 3.

In Fig. 1 there is shown a steel scale 1 of the usual type having a series of graduations 2 along one edge with indicating members as is customary in such scales, the scale being graduated in units either of the English or metric system. Extending transversely of the scale is a plate-like member 3 having an extension 4 extending beyond the graduated edge of the scale. One edge 5 of this extension 4 is formed at an angle of approximately 120 degrees to the adjacent edge 6 of the scale and is graduated in the same units as is such adjacent edge. The plate 3 is provided with a recess or notch 7 along one side in such a position as to show the indicating number attached to the graduation lying opposite or directly under that edge of the plate 2 for convenience in reading and to make it unnecessary to shift the scale to read a desired numeral. The adjacent edge 8 of the plate is formed at a right angle to the scale to allow the same to be used as a square if necessary.

The plate 3 is provided with a raised portion 9 at its opposite side and is then carried down the side of the scale and underneath the same, where it is formed with a portion 10, between which, and the plate 3 proper, the scale is adapted to lie. The scale is thus in substantial contact with the inner surfaces of the plates 3 and 10, in this way providing a sufficient friction between the scale and attachment to hold it in the desired position against accidental movement, while to secure an exact positioning of the attachment on the scale a small set screw 11 is adjustably mounted in the flange or end member of the plate 2, and can be adjusted to engage against the side of the scale and lock the plate in any desired position along the scale.

Two small lugs or wings 12 are stamped up from the body of the plate 2 and stand at right angles thereto, and between these lugs is mounted a pin or stud 13, upon which there is pivotally mounted a clasp 14, while a coil spring 15, having one end against the plate 3, and the other operating against the clasp or clip 14. This clip provides a quick and secure means for fastening the scale into the pocket, the engaging end 16 of the clip being momentarily lifted to engage over the edge of the pocket and then being allowed to clamp the cloth between this end and the scale.

The attachment of my improved device does not impair the usefulness of the scale, which may be used in the usual manner, and for the usual purposes. On the other hand, the edge 5 of the extension 4 of the plate serves as a guide for measuring the angle given to a drill when being ground. The angle of the end of the drill is usually from 58 to 60 degrees, and thus the included angle between the edge 5 and the adjacent edge 6 of the scale should be 118 to 120 degrees, the edge 5 on the plate serving as a gauge against which to measure the angle of the drill during the grinding of it.

The present device is extremely simple in its construction and manufacture and enlarges the usefulness of the ordinary scale, besides providing a secure means for carrying the same without injury or loss.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In combination, a main scale member having a graduated straight edge, and a supplemental scale member slidably mounted thereon and having a graduated straight edge extending at an oblique angle to the straight edge of the main scale member, said supplemental scale member having a body portion surrounding and slidably engaging the sides of the main scale member, said body portion having an enlarged extension at one end to provide a gripping means for adjusting said supplemental scale member along the main scale member.

2. In combination, a main scale member having a graduated straight edge, and a supplemental scale member slidably mounted thereon and having a graduated straight edge extending at an oblique angle to the straight edge of the main scale member, said supplemental scale member having a body portion surrounding and slidably engaging the sides of the main scale member, said body portion provided with a cut-out portion to expose the adjacent scale marking of the main scale member.

3. In combination, a main scale member having a graduated straight edge, and a supplemental scale member slidably mounted thereon and having a graduated straight edge extending at an oblique angle to the straight edge of the main scale member, said supplemental scale member having a body portion surrounding and slidably engaging the sides of the main scale member, said body portion provided with projecting lugs, and a spring clip pivotally mounted on said lugs.

Signed by me this 10th day of July, 1919.

EVERETT A. LA DOW.